Feb. 21, 1928.

G. W. CURTIS 1,659,767

ANIMAL TRAP

Filed March 19, 1926

INVENTOR.
George W. Curtis,
BY Walter N. Haskell,
his ATTORNEY.

Feb. 21, 1928.  1,659,767
G. W. CURTIS
ANIMAL TRAP
Filed March 19, 1926  2 Sheets-Sheet 2
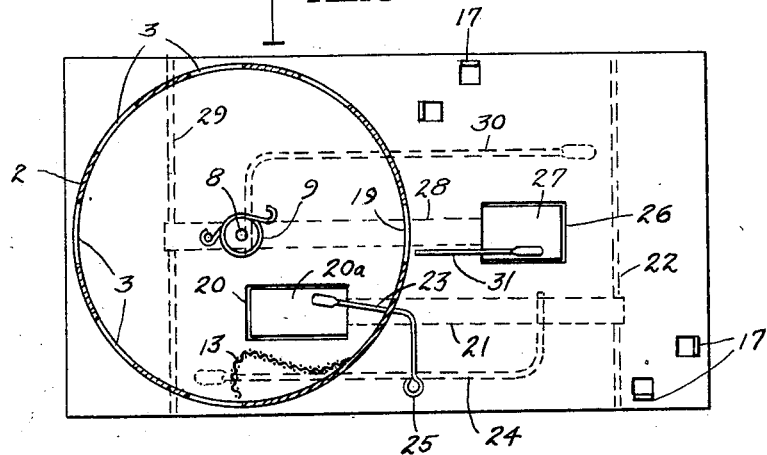
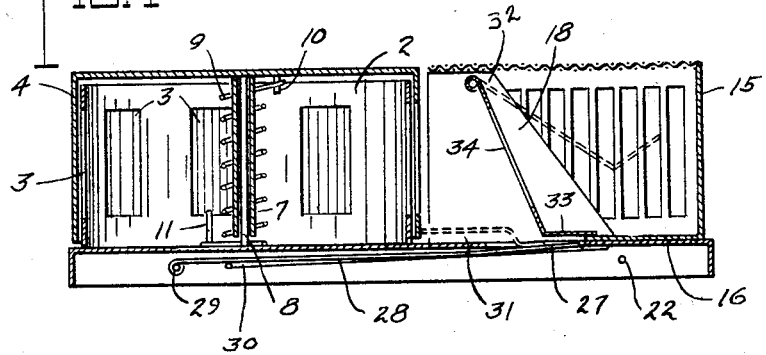
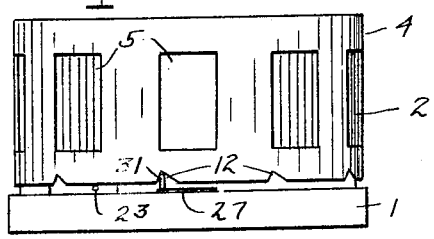
INVENTOR.
George W. Curtis,
BY Walter N. Haskell.
his ATTORNEY.

Patented Feb. 21, 1928.

1,659,767

UNITED STATES PATENT OFFICE.

GEORGE W. CURTIS, OF BOULDER, COLORADO.

ANIMAL TRAP.

Application filed March 19, 1926. Serial No. 95,931.

My invention has reference to animal traps, and relates more specially to improvements in a similar device of that type for which Letters Patent of the United States were issued to myself Nov. 25, 1919, numbered 1,323,024. One of the purposes of the present invention is to simplify the trap and improve the efficiency thereof. Certain cumbersome parts which were liable to get out of order easily have been eliminated, and the general operation of the trap greatly improved.

Another purpose of the invention is to so change the arrangement and operation thereof as to increase the likelihood of the animals being caught therein. In said former trap it was possible for the animals to venture into the trap and out again, without any absolute assurance that they would get caught. It was also possible for them to remain in the runway between the main trap and the cage, after the trap was reset, and attempt to escape upon the trap being sprung by another animal. In the present trap the possibility of the animal springing the trap in the first instance is greatly increased, and the runway passage is greatly reduced, and arranged so as to make the entrance of the animal into the cage more sure.

The invention is more specially designed for the extermination of mice, but it can be readily adapted for use for catching rats and other rodents.

The above-named, and other features and advantages of the invention will more fully appear from the following specification, taken in connection with the accompanying drawings, in which;

Fig. 3 is a plan view with the cylinder 4 and cage 15 removed.

Fig. 4 is a medial longitudinal section of the trap.

Fig. 5 is an end view of the trap with the cage 15 removed.

Figure 1:
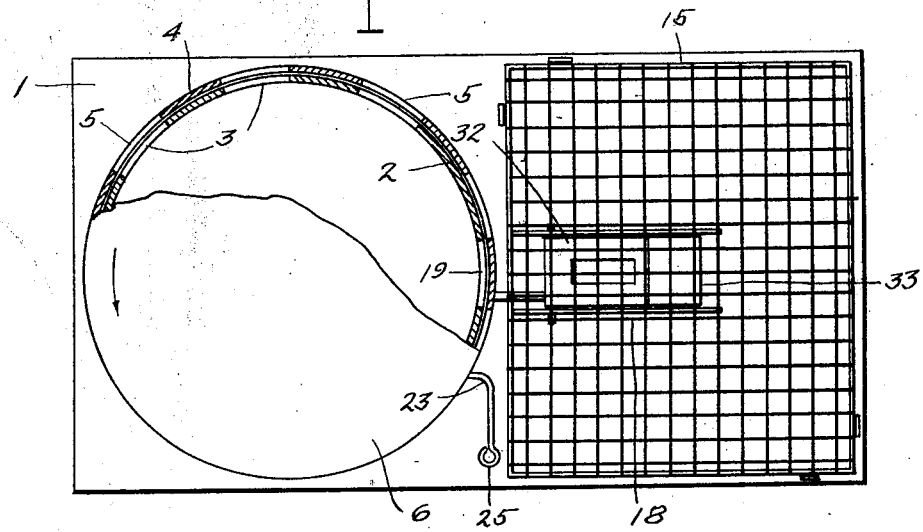
Fig. 1 is a plan view of the invention with the top of the cylinder 4 partly broken away.
Figure 2:
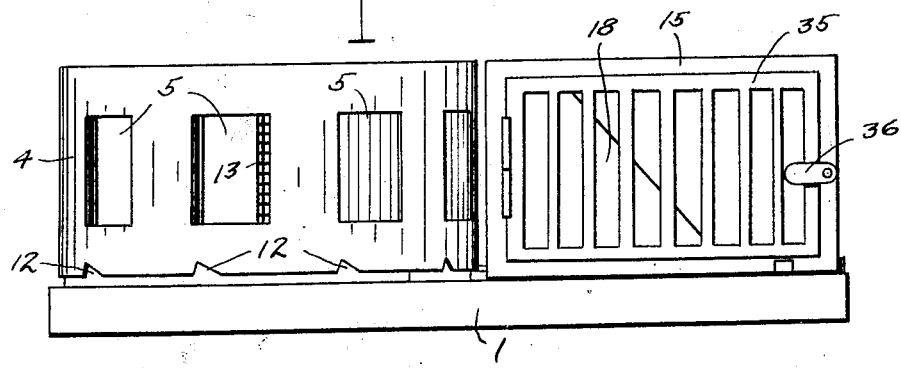
Fig. 2 is a side elevation thereof.

The reference number 1 indicates a base of hollow formation, to one end of which is fixed a cylindrical casing 2, provided at regular intervals with openings 3, of suitable size to permit the passage of the animal it is desired to catch. Encircling said casing is a cylinder 4, provided with a series of openings 5 and enclosed by a top 6. The cylinder 4 is rotatably supported by means of a tubular member 7 fixed to the lower face of the top 6, and rotatable on a pin 8 fixed on the base 1. The openings 3 and 5 are similarly spaced, so that said openings may be caused to register with each other in pairs, as shown in Figures 1 and 2.

Rotation may be imparted to the cylinder 4 by means of a coiled spring 9, connected at its upper end with a pin 10, projected downwardly from the top 6, and at its lower end with a pin 11, supported on the base 1. The spring is preferably attached permanently to the pin 10, so as to be removable with the cylinder 4. By rotating the cylinder by hand in a direction contrary to that shown by the arrow in Fig. 1 the spring 9 is given a tension, the force of which tends to give a return movement to the cylinder in the direction indicated by the arrow. The lower edge of the cylinder 4 is provided with a series of equi-distant ratchet notches 12, for engagement by detent wires in the manner hereinafter pointed out. At one side of the casing 2 is a bait receptacle 13, formed of wire screen or similar material. Said receptacle is open at the top, and may be filled by removing the cylinder 4.

On that end of the base 1 opposite to the cylinder 4 is a cage 15, provided with a bottom plate 16 and held removably in place by means of lugs 17 struck upwardly from the base 1. At a central point in said cage is a run-way 18, in line with an opening 19 in the casing 2, which opening is closed by the wall of the cylinder 4 when the openings 3 and 5 are in register, and is in register with one of the openings 5 when the other openings are out of register. In a central part of the casing 2, near the bait holder 13, is an opening 20, in which is supported a trip 20ª, on the end of an arm 21, fixed to a rod 22, rockingly mounted in the base 1. (Fig. 3.) Fixed to said trip is a wire detent 23, for engagement with the notches 12; the trip and wire being held normally in elevated position by a wire spring 24, fixed to the base at one of its ends, and having a bearing against the arm 21 at the other. The end of the wire 23 is shown fitted with a loop 25, for manual release of the wire from the notches, if desired.

In that part of the base 1 beneath the cage 15 is an opening 26, in which is a trip 27, on the end of an arm 28, fixed to a rod 29 rockingly supported in the base 1. (Shown in broken lines in Fig. 3.) Said trip and arm are held normally in an elevated position by means of a spring arm 30, fixed to the base 1 at one end and bearing against the arm 28 at the other. Fixed to the trip 27 is a wire 31, projecting beneath the edge of the cylinder 4, and adapted for engagement with the notches 12 when the trip is in an elevated position. The wire 31 and wire 23 are spaced from each other so that both of them will not be in engagement with one of said notches at the same time.

In the run-way 18 is a trap door 32, hinged at its upper end, and having an angular foot extension 33, lying partly over the trip 27. Said door is also provided with an opening 34, permitting the animal to see ahead of him and increasing the likelihood of his pushing his way into the cage by elevating the trap door. The trip 27 is so positioned that the animal is likely to step thereon before he begins to raise the trap door, so that the passage behind him is closed, as hereinafter set forth. One of the sides of the cage 15 is fitted with a door 35, held normally closed by a catch 36. In the case of any animals being discovered in the cage it can be removed from the base and the animals drowned, the dead animals being then emptied from the cage through the door 35

The spacing of the detents 23 and 31 is such that only one thereof can be in position to hold the cylinder 4 from turning at the same time. With the trap in set position, as shown in Figures 1 and 2, the wire 23 is in engagement with one of the notches 12, and upon an animal stepping upon the trip 20ª the wire 23 is moved downwardly with the trip, releasing the same from engagement with the notch, permitting a movement of the cylinder to close the openings 3 and 5, the movement being interrupted by the engagement by the wire 31 with the notch just vacated by the wire 23. This holds the cylinder with one of the openings 5 in register with the opening 19, as shown in Fig. 5. The progress of the animal through said openings and into the cage 15 serves to release the wire 31 and re-set the trap.

The trip 20ª is not only stationed at a point convenient to the bait receptacle, but it is also well within the passage way formed around the central post and spring in the center of the casing 2, so that it is impossible for the animal which enters the trap to move about therein to any extent without treading thereon, and incarcerating itself. The passage-way into the cage is also so limited that there is no likelihood of his trying to remain therein.

The spring 9 can be readily wound and the trap placed in condition for catching the animals by turning the cylinder 4 in the manner hereinbefore described. Said cylinder can be easily removed at any time when the spring is un-wound, and the tension thereof can be relieved at any time by holding down the wires 23 and 31, permitting the cylinder to rotate freely. The trap door 32 is fully enclosed within the runway, so that there is no danger of its being lifted by animals in the cage.

What I claim, and desire to secure by Letters Patent, is:

1. An animal trap, comprising a base, a casing supported thereon and provided with a plurality of entrance openings and an exit aperture, a cylinder provided with a plurality of openings adapted for alternative register with said entrance openings and said exit, and having means for detent engagement, a stem and sleeve connection between said base and cylinder, permitting a rotary movement of the cylinder with relation to said casing, a tension spring connection on said stem and sleeve connection, connecting said cylinder and base, and a spring-actuated trip in said casing provided with a detent for engagement with said first-named detent means, to hold said cylinder normally with the openings therein in register with the entrance openings in said casing.

2. A device of the class described, comprising a base, a casing mounted on one end thereof, provided with an entrance opening and an exit aperture, a cylinder rotatably mounted with reference to said casing, having a plurality of openings adapted for alternative engagement with said entrance opening and exit aperture, and provided with detent engaging devices, stored power devices within said cylinder for causing the rotation thereof, a bait container in said casing, normally closed by said cylinder, a cage on the opposite end of said base having a runway centrally thereof, in line with said exit, a spring-controlled trip in said casing provided with a detent for engagement with said detent engaging devices, to hold said cylinder in a set position, a spring-controlled trip in said run-way, provided with a detent for engagement with said detent engaging devices, to hold said cylinder in position in communication with said cage, and a trap-door in said run-way, partially covering said last-named trip when the trap-door is closed.

In testimony whereof I affix my signature.

GEORGE W. CURTIS.